United States Patent [19]

Alexandrov et al.

[11] 3,984,254

[45] Oct. 5, 1976

[54] MACHINE FOR WASHING PNEUMATIC CONVEYANCE CONTAINERS

[76] Inventors: Adolf Moritsovich Alexandrov, Federativny prospekt, 6, korpus 3, kv. 8; Vladimir Efimovich Aglitsky, Zatsepsky val, 6/13, kv. 61; Ilya Solomonovich Kantor, Malo-Moskovskaya ulitsa, 31, kv. 45; Viktor Markovich Brodsky, 2 Filevskaya ulitsa, 7/19, korpus 6, kv. 21; Jury Abramovich Tsimbler, Sojuzny prospekt, 10, kv. 261; Jury Arnoldovich Topolyansky, Matveevskaya ulitsa, 10, korpus 4, kv. 233, all of Moscow, U.S.S.R.

[22] Filed: Apr. 18, 1975

[21] Appl. No.: 569,546

[30] Foreign Application Priority Data

Apr. 26, 1974 U.S.S.R................................ 2015801

[52] U.S. Cl............................... 134/56 R; 134/116; 134/123; 134/152; 134/180
[51] Int. Cl.²........................ B08B 3/02; B08B 9/00
[58] Field of Search............ 134/45, 56 R, 116, 123, 134/152, 167 R, 172, 180, 199

[56] References Cited
UNITED STATES PATENTS

| | | | |
|---|---|---|---|
| 2,712,320 | 7/1955 | Schroeder et al.................. | 134/123 |
| 3,362,418 | 1/1968 | Herold.............................. | 134/56 R |
| 3,688,782 | 9/1972 | Smith............................... | 134/152 X |
| 3,736,948 | 6/1973 | Crosswhite....................... | 134/123 X |
| 3,799,620 | 3/1974 | Robinson et al................. | 134/123 X |

FOREIGN PATENTS OR APPLICATIONS

| | | | |
|---|---|---|---|
| 37,653 | 6/1909 | Austria............................. | 134/199 |
| 197,670 | 11/1967 | U.S.S.R............................ | 134/123 |

Primary Examiner—Robert L. Bleutge
Attorney, Agent, or Firm—Lackenbach, Lilling & Siegel

[57] ABSTRACT

A machine comprising a trough with pipe pieces provided one at each end thereof for the purpose of accommodating wheeled trolleys carrying the containers. A tubular frame with nozzles is positioned over the trough and is adapted to move axially therealong. The frame is arranged to communicate with the source of the washing medium for the purpose of delivering the washing medium to the nozzles. The trough consists of a stationary bottom member and side flaps mounted adjacent thereto. A drive is arranged to open said flaps during the washing process and close them after the washing to permit the container to be moved in the trough. The machine is simple in construction and can be readily fitted to a pneumatic conveyance pipeline handling domestic refuse and other loads contaminating the conveyance containers.

1 Claim, 8 Drawing Figures

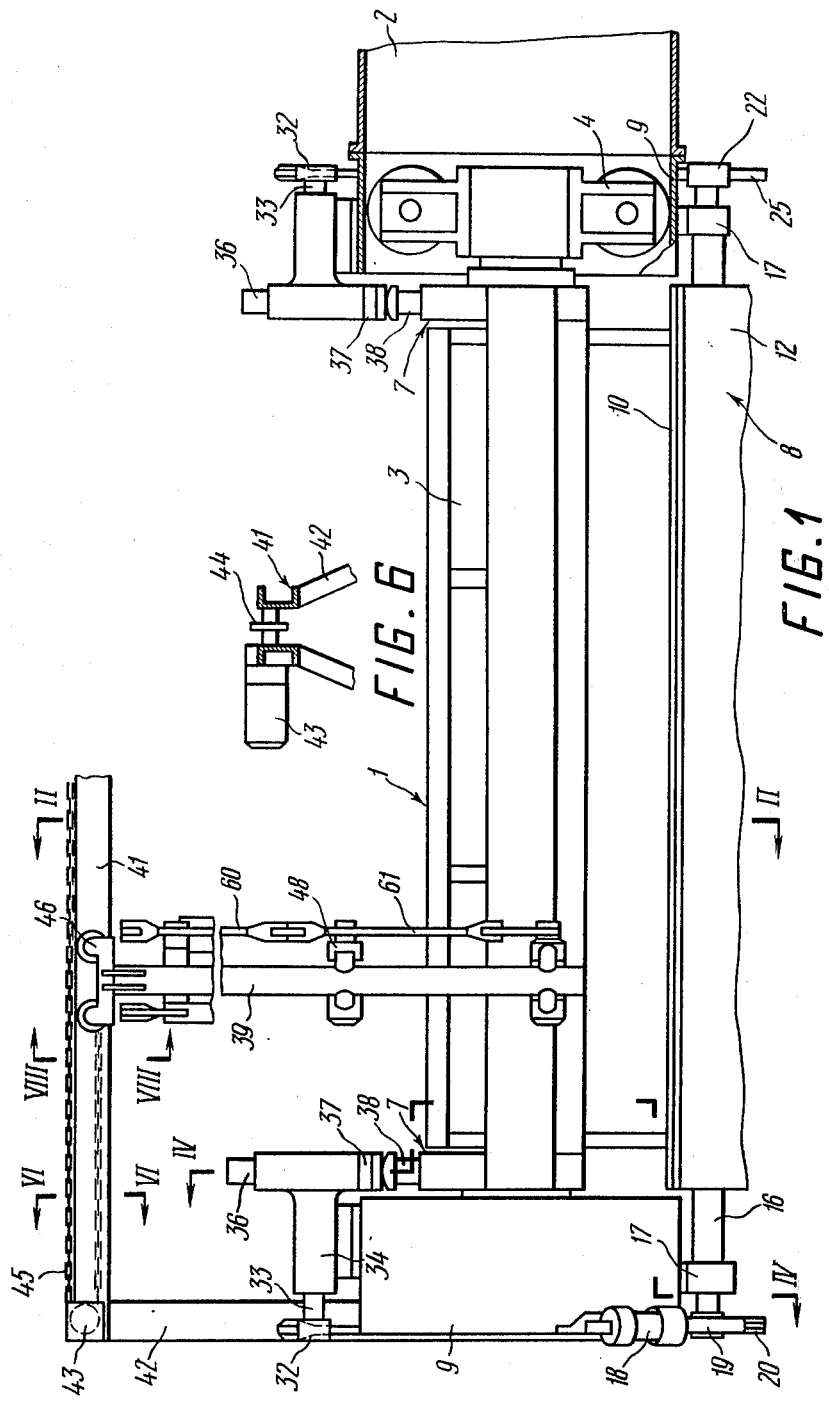

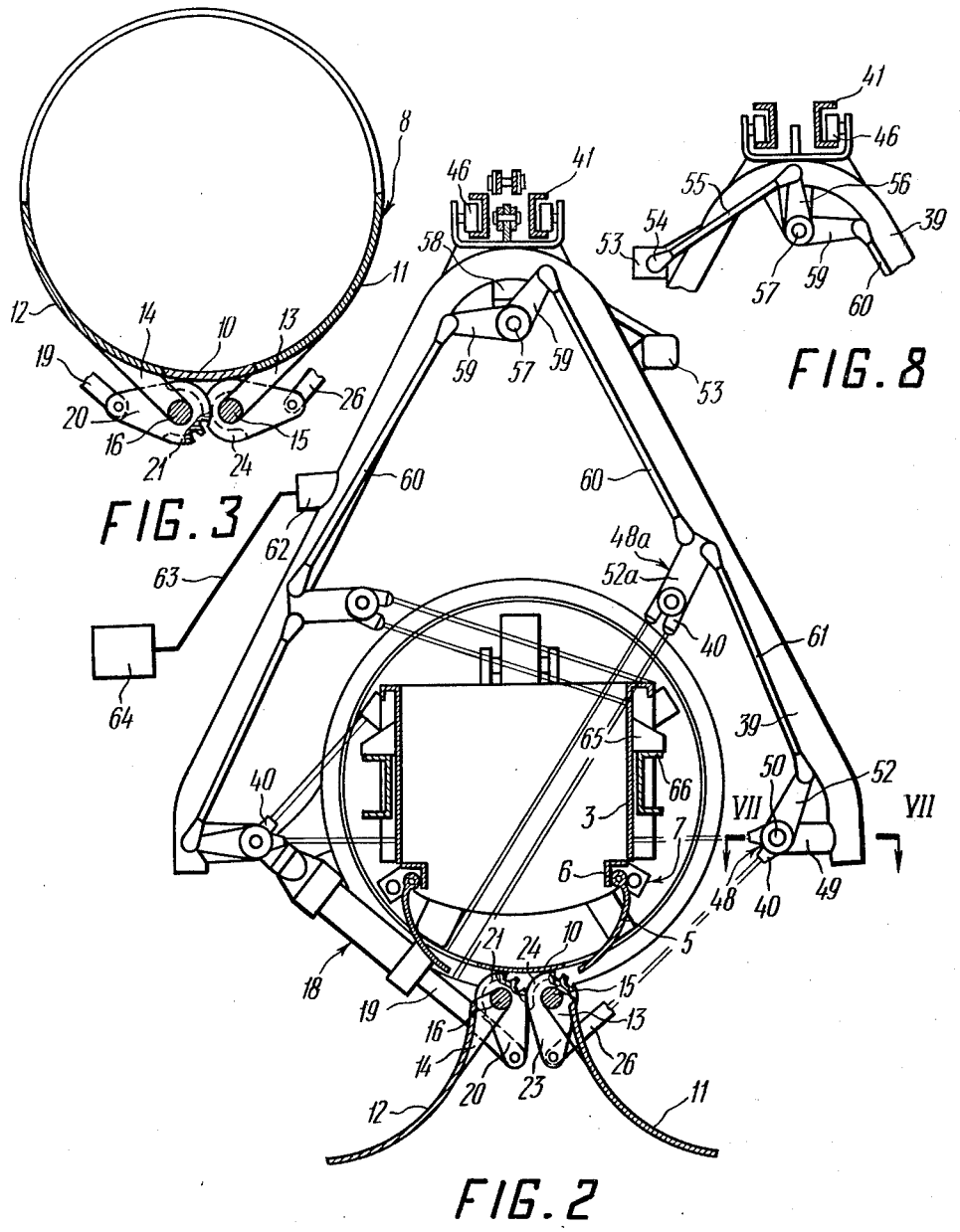

MACHINE FOR WASHING PNEUMATIC CONVEYANCE CONTAINERS

The present invention relates to pneumatic pipeline conveyances and more particularly to machines for washing containers employed in such conveyances.

The invention may be used with particular advantage in pneumatic conveyances designed to handle domestic refuse and other loads that contaminate the conveyance containers.

Pneumatic conveyances have of late found wide use, particularly in urban service, in handling domestic refuse and other loads that contaminate the conveyance containers. This has given rise to the problem of cleaning the containers after use inasmuch as contaminations hamper the movement of the containers and are objectional from the sanitation viewpoint.

Heretofore pneumatic conveyances have been used only in mail and bulk load applications, there being no need for washing the containers. In this connection no specialized container washing means are known nowadays.

It is an object of the present invention to provide a container washing machine for use in pneumatic conveyances handling loads which contaminate the containers.

Another purpose of the invention is to provide a container washing machine simple in construction and dependable in operation.

With these and other objects in view, there is provided a machine for washing pneumatic conveyance containers, said containers each having a receptacle mounted on wheeled trolleys, hinged doors and a spring-operated linkage to hold said doors closed. According to the invention, the washing machine comprises a trough and a frame. The trough is formed of a stationary bottom member and side flaps situated adjacent to either side thereof. Pipe pieces are provided, one at each end of said trough, for the purpose of accommodating the wheeled trolleys which carry the containers. The frame is a tubular structure carrying nozzles and positioned over said trough. Said frame is arranged to communicate with the source of the washing medium and is adapted to move axially along said trough whose side flaps are connected to a drive which is arranged to open said flaps in the process of washing the container receptacle and at the same time to actuate said spring-operated linkage in order to open the container doors.

The container washing machine which constitutes the present invention is designed for mounting on the pneumatic conveyance pipeline near the loading or the unloading station or in another place that may be found suitable.

The machine constructed according to this invention is simple to manufacture and dependable to operate and may be used with advantage for efficient washing throughout the container receptacle.

Now the invention will be described in detail with reference to the accompanying drawings in which:

FIG. 1 is a side elevational view (partially broken away in a few places) of the container washing machine, according to the invention.

FIG. 2 is a section on the line II—II of FIG. 1, showing the trough with the side flaps open.

FIG. 3 shows the trough with the side flaps closed.

FIG. 6 is a sectional view taken on the line VI—VI of FIG. 1 (chain not shown).

FIG. 8 is a sectional view taken on the line VIII—VIII of FIG. 1 (chain not shown).

According to the invention, the machine is designed for washing containers 1 (FIG. 1) adapted to move inside of a pipe 2, said pipe being a component of a domestic refuse pneumatic conveyance pipeline. The containers are constructed as described below.

Figure 4:
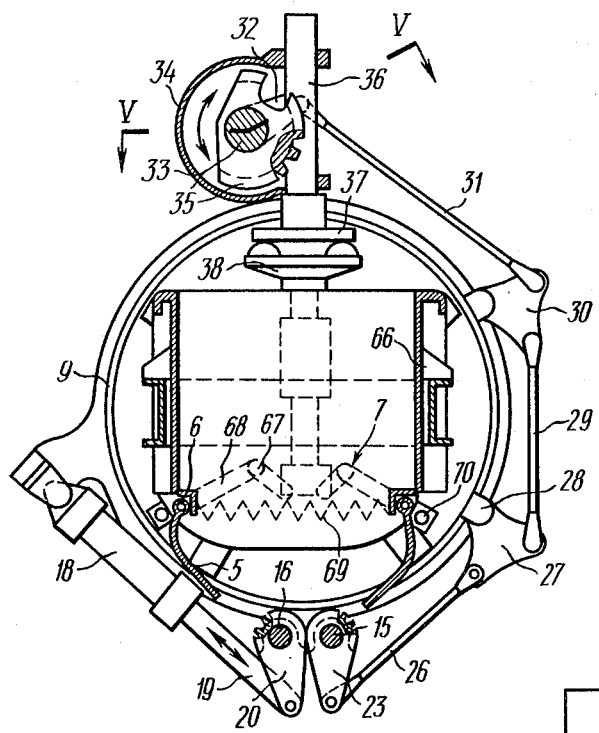
FIG. 4 is a sectional view taken on the line IV—IV of FIG. 1.

The container has a load receptacle 3 mounted on wheeled trolleys 4. The top of the receptacle 3 is open, whereas the bottom is closed by doors 5 (FIG. 2) pivotally mounted to the receptacle by means of hinges 6. During the loading of the receptacle 3 and the transportation of the container 1 the doors 5 are held closed by means of a spring-operated linkage 7 (FIGS. 2 and 4).

The washing machine comprises a trough 8 (FIG. 1). Pipe pieces 9, substantially of the same diameter as the pipe 2, are mounted one at each end of the trough 8. Said pipe pieces 9 are intended for accommodating the trolleys 4 of the container 1 during the washing of the receptacle 3. The trough 8 serves the purpose of guiding one of the trolleys 4 while the container 1 is being positioned for washing. During the process of washing the container 1 its load receptacle 3 is held in a position above the trough 8, the length of which is substantially equal to the length of the receptacle 3. The trough 8 consists of a stationary bottom member 10 (FIGS. 2 and 3) and side flaps 11 and 12 situated adjacent to either side thereof. For the side flaps 11 and 12 to be swung open when washing the receptacle 3 (FIG. 2), they are fixedly mounted to pivots 15 and 16 by means of brackets 13 and 14 respectively (FIGS. 2 and 3). Said pivots are mounted in brackets 17 (FIG. 1) secured to the bottom side of the pipe pieces 9. Hinged to one of the pipe pieces 9 is a power cylinder 18 arranged to open the side flaps 11 and 12 to enable the washing of the receptacle 3 and to close said side flaps after the washing so as to enable the trolley 4 of the container 1 to be moved into the pipe 2. The extending end of the power cylinder piston rod 19 is articulated to a lever 20 which is fixedly mounted to one end of the pivot 16. The end of the lever 20 remote from the piston rod attachment point has a toothed rim 21. The other end of the pivot 16 carries a gear 22 (FIG. 1). One end of the pivot 15 carries a lever 23 (FIG. 2) fixedly mounted thereto and provided with a toothed rim 24 arranged to mesh with the toothed rim 21 of the lever 20. Mounted on the other end of the pivot 15 in the same manner as the lever 23 is a lever 25 (FIG. 1) whose toothed rim (not shown) is arranged to mesh with the gear 22. The levers 23 (FIG. 2) and 25 (FIG. 1) mounted on the pivot 15 (FIG. 2) are connected through kinematic chains with the spring-operated linkage 7 so that said linkage can be actuated by the power cylinder 18 in order to simultaneously open the side flaps 11 and 12 of the trough 8 and the doors 5 of the container 1.

The kinematic chain which connects the levers 23 and 25 with the components of the spring-operated linkage 7 on one side of the receptable 3 is identical with the kinematic chain on the other side of the receptacle and, therefore, the description given hereinafter is equally applicable to both.

Said kinematic chain comprises a rod 26 (FIG. 4) articulated at one end to the lever 23 and at the other end to a lever 27 whose pivot 28 is mounted on the pipe piece 9. The other arm of the lever 27 is articulated to the end of a rod 29 whose opposite end is articulated to a lever 30 constructed in the same manner as the lever 27.

Figure 5:
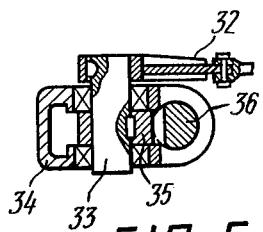
FIG. 5 is a sectional view taken on the line V—V of FIG. 4.

The opposite arm of this lever 30 is articulated through a rod 31 (FIGS. 4 and 5) to a lever 32 fixedly mounted on a pivot 33. The ends of the pivot 33 are rotatably mounted in a housing 34.

The housing 34 is mounted on the pipe piece 9 (FIG. 4). The pivot 33 carries a toothed sector 35 arranged to mesh with a rack 36. Mounted on the bottom end of the rack 36 is a tappet 37 arranged to operate a pushrod 38 incorporated in the spring-operated linkage 7.

Positioned over the trough 8 (FIGS. 1 and 2) is an arch-shaped tubular frame 39 carrying nozzles 40 (FIG. 2). The nozzles 40 are spaced so as to expose the entire surface of the receptacle 3 to the jets of the washing medium and enable each pair of adjacent jets to overlap.

The frame 38 is adapted to move axially along the trough 8. For that purpose, a runway 41 made up of two channel girders is mounted over the trough 8, substantially parallel to the axis thereof.

The runway 41 is fixedly mounted in U-shaped supports located near each pipe piece 9. It may be desirable that the runway be mounted to the ceiling of the building accommodating the machine.

Mounted at the end of the runway 41 is a reversible motor 43 (FIG. 1) with a sprocket 44 (FIG. 6) carried on the shaft thereof. Another sprocket (not shown) is situated at the other end of the runway 41. The two sprockets are connected by means of a roller chain 45 (FIGS. 1 and 2). The runway 41 carries a trolley 46 with a frame 39 fixedly mounted thereon. The trolley 46 is attached to the roller chain 45 by means of pin 47.

Figure 7:
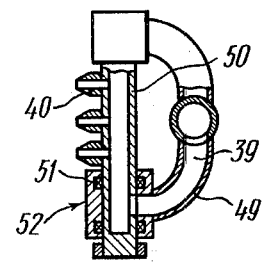
FIG. 7 is a sectional view taken on the line VII—VII of FIG. 2.

The nozzles 40 are mounted on the tubular frame 39 by means of heads 48 and 48a. Each head comprises a pipe piece 49 (FIG. 7) communicating through a pipe piece 50 with the nozzles 40. The pipe piece 50 is blanked off at each end, mounted in bearings 51 and attached to a lever 52 (52a). The nozzles 40 of each ead 48 and 48a are adapted to be oscillated in the plane of the tubular frame 39. To impart an oscillating motion to the nozzles 40 of each head 48 and 48a, the levers 52 and 52a respectively are connected through a kinematic chain with a motor 53 (FIGS. 2 and 8) mounted on the frame 39.

Said kinematic chain comprises a crank 54 (FIG. 8) mounted on the shaft of the motor 53 and linked to a connecting rod 55 the other end of which is linked to a lever 56 mounted on a pivot 57 rotatably carried in a bracker 58 (FIG. 2). The bracket 58 is mounted on the frame 39. The pin 57 mounts a bell crank 59 whose arms are connected to rods 60. The other end of each rod 60 is articulated to the lever 52a or the head 48a.

The lever 52 a is articulated through a rod 61 to the lever 52 of the head 48. The tubular frame 39 is connected through a union 62 and a flexible hose 63 with the washing medium source 64 for the purpose of feeding the washing medium to the nozzles 40.

The washing machine operates as follows:

The container 1 is moved from the pipe 2 into the machine. One of the trolleys 4 passes through the trough 8 whose side flaps 11 and 12 are held closed. The two trolleys 4 get positioned in the pipe pieces 9, whereas the receptacle 1, whose abutments 65 bear against a trolley coupling frame 66, gets positioned over the trough 8. The frame 39 is now in an extreme position, over one of the pipe pieces 9.

The power cylinder 18 extends and the piston rod 19 moves the lever 20, causing the pivot 16 to turn together with the side flap 12 attached thereto. The movement of the pivot 16 is simultaneously transmitted through the toothed rim 21 of the lever 20 and the gear 22 to the toothed rims of the levers 23 and 25 and these levers turn the pivot 15 together with the side flap 11 attached thereto.

The rotational movement of the levers 23 and 25 is changed into translational motion of the rack 36 and tappet 37 by means of the rods 26, levers 27, rods 29, levers 30, rods 31, levers 32, pivot 33 and toothed sectors 35. The tappets 37 operate the pushrods 38 and the latter move double-arm levers 68 (mounted on pivots 67 attached to the frame 66). The double-arm levers 68 spread the spring 69 which is attached to their lower ends. The rods 70, which are articulated to the ends of the levers 68 and positioned along the receptacle 3, move apart, releasing the doors 5 and permitting them to open under their own weight.

The washing medium is delivered under pressure from the source 64 via the union 62 and the flexible hose 63 into the tubular frame 39 and thence, via the pipe pieces 49 and 50, to the nozzles 40.

At the same time the motors 43 and 53 are switched on. The drive from the motor 43 is transmitted through the sprockets 44 and the roller chain 45 to the trolley 46 which carries the frame 39. The trolley carries the frame along the runway 41.

The drive from the motor 53 is transmitted through the crank 54, connecting rod 55, levers 56, bell cranks 59, rods 60, levers 52a , rods 61 and levers 52 to the pipe pieces 50, whereby said pipe pieces together with the nozzles 40 are caused to oscillate in the plane of the frame 39, the jets of the washing medium moving in a varying trajectory.

During the washing process the frame 39 together with the nozzles 40 makes the desired number of strokes to and fro to ensure a thorough washing of the receptacle 3 throughout its length (the number of the frame strokes is to be preset according to the contamination of the receptacle).

Upon completion of the washing, when the frame 39 occupies an extreme position over one of the pipe pieces 9, the motors 43 and 53 are switched off and the washing medium source is shut off. The power cylinder 18 retracts, closing the flaps 11 and 12 of the trough 8 and the doors 5 of the container 1.

The container is moved out of the trough 8 into the pipe 2.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims.

What is claimed is:

1. A machine for washing pneumatic conveyance containers, said containers each having a receptacle mounted on wheeled trolleys, hinged doors and a spring-operated linkage to hold said doors closed, said machine comprising: a trough to guide the movement of said container trolleys, said trough having a stationary bottom member and hinged side flaps situated adjacent to either side thereof; pipe pieces provided one at each end of said trough for the purpose of accommodating the wheeled trolleys of said container during the washing thereof; a tubular frame positioned over said trough; nozzles mounted on said frame with the required spacing; a source of the washing medium communicating with said frame for the purpose of delivering the washing medium to said nozzles; a means for moving said frame axially along the trough; a drive arranged to operate said trough flaps so as to open them during the washing process and close them after the washing, said drive being kinematically connected with said spring-operated linkage so as to open said container doors simultaneously with said trough flaps.

* * * * *